Figure 1:
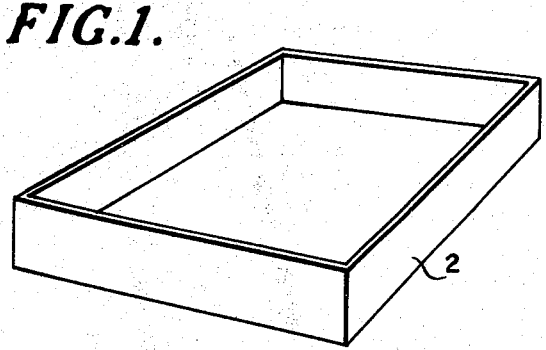

Feb. 16, 1971 W. C. RAINER ETAL 3,563,869
IRRADIATED POLYETHYLENE
Filed Nov. 5, 1967

INVENTORS
WILLIAM C. RAINER
EDWARD M. REDDING
ARTHUR W. SLOAN
WILLIAM D. STEWART
JOSEPH J. HITOV
BY Cushman, Darby & Cushman
ATTORNEYS United States Patent Office 3,563,869
Patented Feb. 16, 1971

3,563,869
IRRADIATED POLYETHYLENE
William C. Rainer, Baltimore, Md., Joseph J. Hitov, East Orange, N.J., Edward M. Redding, Baltimore, Md., and Arthur W. Sloan and William D. Stewart, Alexandria, Va., assignors, by mesne assignments, to W. R. Grace & Co., Cambridge, Mass., a corporation of Connecticut
Continuation-in-part of application Ser. No. 517,943, June 24, 1955, now Patent No. 3,097,150. This application Nov. 5, 1957, Ser. No. 694,662
Int. Cl. C08f 1/10; C08d 3/04
U.S. Cl. 204—159.2                       21 Claims This application is a continuation-in-part of application Ser. No. 517,943, filed June 24, 1955, now Pat. No. 3,097,150.

The present invention relates to polyethylene.

Polyethylene is widely used today in making containers, e.g., squeeze bottles, toys, film packaging materials, etc. Despite its many advantages in these and other uses, it suffers from the disadvantage that it is normally translucent or opaque rather than transparent in appearance at room temperature and, hence, cannot be used in applications where a clear, water-white material is desired.

It is known that solid polyethylene can be physically transformed into a clear, transparent plastic or liquid, when elevated to its transition point, which is approximately 105° to 125° C. However, this transparency is normally lost upon cooling, unless special methods are employed and, even with such special methods, the transparency is not retained if the polymer is remelted and slowly cooled. The transition point of polyethylene is commonly referred to as its melting point. Due to the fact that polyethylene is a plastic, it does not have a sharp melting point. There also is some variation in melting point, depending on the average molecular weight of the polymer. With a molecular weight of about 20,000 the melting point is generally about 115° C.

In the past, it has been proposed to make transparent polyethylene film by heating polyethylene and then quick-cooling the same to room temperature or below. Alternatively, it has been suggested to obtain transparency by stretching the polyethylene. These procedures, while giving transparent polyethylene, suffer from the disadvantage that this transparency is not retained if the polyethylene is submitted, for example, to further physical changes, such as heating and slow cooling and, it has not proven feasible to retain the clarity during subsequent shaping operations.

Accordingly, it is a primary object of the invention to prepare a polyethylene which remains clear and transparent, e.g., water-white, regardless of change in physical form. For example, films of such clear and transparent polyethylene can, by irradiation, if the irradiation is not carried out to too great an extent, be heated to at least its clear point, molded into desired shape and then re-cooled to form a new product which retains the clarity and transparency of the original film.

It is a further object of the invention to prepare a polyethylene which can be molded by conventional transfer, compression, extrusion and injection molding procedures to obtain a clear, water-white product.

Another object of the invention is to prepare a clear water-white polyethylene of increased strength and toughness.

A still further object is to prevent or reduce the discoloration caused by free radical engendering agents employed to cross-link polyethylene.

Another object is to reduce the amount of irradiation treatment while, at the same time, obtaining an equivalent amount of cross-linking and toughening of the polymer.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained and transparent, substantially colorless, i.e., water-white, solid polyethylene can be prepared in a form which can be reproduced, regardless of the subsequent physical change of the polyethylene, by treating polyethylene with a free radical engendering substance and also irradiating the polymer. The irradiation treatment can be carried out before, simultaneously with, or subsequent to the treatment with the free radical engendering material. In order to fix clarity against subsequent heating and slow cooling, the irradiation treatment should be carried out while the polyethylene is in a clear condition. This can be accomplished in numerous ways.

Thus, the polyethylene can be heated until molten, irradiated while molten to at least partially fix the clarity, as is more fully set forth in copending application Ser. No. 513,252, filed June 6, 1959, now Pat. 2,878,174, or the polyethylene can be cold calendered, e.g., at 80° C. or below, to decrease its thickness to ¼ or ⅕ its original value, to obtain clarity and then, the clear polymer irradiated either hot or cold to fix the clarity, as is more fully set forth in copending application Ser. No. 523,315, filed July 20, 1955 now abandoned. Or the polyethylene can be heated to at least about 90° C. but below the melting point thereof, and hot stretched 175% or greater, to increase the clarity and, while so stretched and clear, irradiated either hot or cold to fix the clarity as set forth more fully in copending application, Ser. No. 516,236, filed June 17, 1955, now Pat. 2,877,500. Or the polyethylene can be heated until molten and then quick quenched, e.g., to room temperature or below and then irradiated either hot or cold, while in the clear condition, to fix the clarity, as is more fully set forth in copending application Ser. No. 523,316, filed July 20, 1955, now Pat. No. 2,855,-517, issued Oct. 7, 1958.

Or the polyethylene can be irradiated cold, e.g., room temperature, the temperature raised to the melting point of the original polymer and then quick quenched. In this procedure, the clear polymer can be further irradiated, either hot or cold, to fix the clarity, as is more fully set forth in copending application Ser. No. 513,602, filed June 6, 1955, now Pat. 2,904,480.

As previously stated, the present invention comprises combining such an irradiation treatment with a treatment with free radical engendering compounds.

Typical examples of such compounds are peroxy compounds, such as benzoyl peroxide, halogenated benzoyl peroxide, e.g., 4-chlorobenzoyl peroxide, acetyl peroxide, lauroyl peroxide, di-t-butyl peroxide, t-butyl hydroperoxide, cumene hydroperoxide, methyl ethyl ketone peroxide, hydrogen peroxide, or any other of the peroxides recited in Schildknecht's "Vinyl and Related Polymers" (1952), page 78, Table 4, as well as dicumyl peroxide, persulfates, such as ammonium, sodium and potassium persulfates, perborates, e.g., sodium perborate and percarbonates, e.g., sodium percarbonate. Likewise, as the free radical type catalyst, there can be used azo compounds having the azo—N=N—, group acyclic joined to discrete non-aromatic carbons, at least one of which is a tertiary carbon, in turn joined to carbon whose remaining valences are satisfied by oxygen and/or nitrogen (as in Hunt, U.S. Pat. No. 2,471,959, the entire disclosure of which is incorporated by reference), such as azodiisobutyronitrile. When foaming is not desired, care should be taken with the azo compounds that the temperature treatment is not too high.

There also can be employed other free radical engendering compounds, such as those described in Fuller Pat. No. 2,442,330, see column 5, lines 16 to 36; Kent Pat. No. 2,528,523, see column 6, lines 19 to 52, and Pinkney Pat. No. 2,628,214, see column 6, lines 19 to 52. The entire disclosures of Fuller, Kent and Pinkney are incorporated by reference.

The treatment with the free radical engendering compounds can be carried out at the conventional temperatures employed with such materials, e.g., 70° C. to 250° C. and usually 100° C. to 150° C. It has been found that the use of irradiation simultaneously with the free radical engendering compound, e.g., a peroxide, enhances the breakdown of the latter, especially at elevated temperatures, e.g., 120° C., so that it is possible to employ the latter at lower temperatures or for shorter periods of time than would otherwise be possible. Additionally, adding the peroxide at the melting point insures a clear cross-linked product, as cross-linking will not result before the melting point is reached.

The peroxide treatment can be carried out for from 10 seconds or less to 6 hours or more. The time of treatment depends on the amount of irradiation applied, as well as on the temperature and particular free radical engendering compound and amount thereof employed.

Generally, from 0.5% to 20%, and preferably from 5% to 10% by weight of the free radical engendering material are used, based on the polyethylene.

To insure the utmost in clarity, the free radical engendering agent, if it is added prior to or simultaneously with the irradiation treatment, is added at or above the melting point of the polyethylene.

Especially good results have been obtained when the free radical engendering agent is employed as a mixture of an oxidizing agent and a reducing agent, as is conventional in redox polymerization. In such a system, there can be employed equivalent amounts of the oxidizing agent and the reducing agent or either can be in excess. The oxidizing agent can be any of the peroxides, persulfates or other peroxy compounds previously mentioned. As the reducing agents, there can be employed sodium bisulfite, sodium sulfite, sodium meta bisulfite, sodium formaldehyde sulfoxylate, as well as the corresponding heavy metal salts of these acids, such as the ferrous, cuprous and 2-valence chromium salts. There also can be employed reducing agents, such as cobalt resinate and naphthenate. Other reducing agents include hydroquinone, hydroxylamine, hydrazine, sodium thiosulfate and hyposulfite. Sugars, such a glucose, fructose, dihydroxyacetone, etc., can be used, as well as any of the reducing agents recited in Stewart Pats. No. 2,380,473 and No. 2,380,475. The preferred redox systems are those which are oil soluble. Lead (valence 2) compounds, e.g., lead naphthenate, are quite useful.

In general, there can be employed the redox systems described by Karl Ziegler in "Review of German Science, 1939–1946, Preparative Organic Chemistry—Part III," pages 192 to 213. The composition described in the summary of the work of Kern et al., Deutsche Patentanmeldung I77133–I77452 being of especial value. Preferably, however, methyl ethyl ketone peroxide is used, rather than benzoyl peroxide, in order to reduce the possibility of staining the final product.

Irradiation permanently fixes the water-clear transparency in the polyethylene, so that subsequent alternations in physical environment, e.g., heating to the transition point of the polymer before irradiation, and cooling gradually back to room temperature, do not remove the transparent characteristics of the treated polyethylene.

The polyethylene employed should be one which is solid at room temperature and may have a molecular weight of 7,000, 12,000, 19,000, 21,000, 24,000, 30,000, 35,000 or even higher. For many useful results, the molecular weight should be at least 12,000, and preferably the molecular weight is about 20,000 to 28,000.

The use of the free radical engendering material assists in fixing the clarity of the product and also serves the important function of reducing the amount of irradiation required to obtain any specific degree of clarity and toughness. The combination of the free radical engendering material and irradiation has been found to be mutually cooperative in obtaining a maximum of permanent or fixed clarity and strength for the polymer in a minimum of time and at a minimum cost. It is surprising that irradiation will set or fix the clarity of the polyethylene as set forth herein. Additionally, the literature does not indicate that the use of a free radical engendering material, e.g., a peroxide, will set the clarity of the polymer.

The following examples illustrate typical methods of carrying out the invention. In the examples, all percentages are percent by weight of the polyethylene, unless otherwise indicated.

EXAMPLE 1

A Van de Graaff electrostatic generator, manufactured by the High-Voltage Engineering Corporation, Cambridge, Mass., was used as a source of a beam of electrons. This machine is a high voltage X-ray generator and was modified by removal of the tungsten target from the path of the electrons to permit thereby irradiation of objects at the port. The generator was operated at 2,000,000 volts with an amperage of 41 microamps at the target area per inch of scan.

Procedure: A strip heater, equipped with a Variac, was fitted with a clamp to hold a flat Vycor glass crucible cover. The crucible cover was the container for the polyethylene. The Variac was adjusted to give a melt temperature of 120° C. to 130° C. (previously measured by a thermocouple), and held at this temperature. Samples of polyethylene with a molecular weight of about 20,000 (Du Pont's PM–1) in the form of discs (a), (b), (c) and (d), each disc being one inch in diameter and 0.010 inch thickness, were inserted into separate Vycor dishes and melted. This required about 30 seconds for each sample. The dishes were then inserted at the port of the machine, centered and irradiated. Exposure periods for irradiation for the molten polyethylene were:

| Sample: | Seconds |
| --- | --- |
| (a) | 2 |
| (b) | 9 |
| (c) | 30 |
| (d) | 60 |

While the polyethylene in the dishes was molten and just before being subjected to the irradiation, there was added to each dish 5% of methyl ethyl ketone peroxide so that, in effect, there was a simultaneous action of the peroxide and the irradiation on the polymer.

After irradiation, the molten samples in the Vycor dishes were allowed to cool to room temperature and were then stripped from the dish.

In each of (a), (b), (c) and (d), the product was a clear, substantially water-white transparent solid which, upon heating to the original melting point, could be recooled with retention of these properties to a significant extent. The samples showed progressively increasing retention of clarity with increasing irradiation dosage from 2 to 60 seconds. With the instrument employed, a dosage of $2 \times 10^6$ r.e.p. is given with each 0.75 second of treatment.

With extremely short periods of irradiation as in Example 1(a), it has been found best to quench the polyethylene immediately after irradiation, as by quenching in an ice bath at about 2° C. for example. The quenching, however, is not as essential here as in the case where the peroxide is omitted.

It is also possible to treat with peroxide before forming the polyethylene into a sheet. Thus, polyethylene (molecular weight 20,000) in powder form was treated with 5% by weight of methyl ethyl ketone peroxide at room temperature for twenty-four hours and samples thereof were then brought to the melting point and irradiation as in Example 1 for varying lengths of time, including (a) 2 seconds, (b) 9 seconds, (c) 30 seconds and (d) 60 seconds. The results obtained were comparable with the results previously indicated for Example 1 with the corresponding time of treatment.

EXAMPLE 2

Polyethylene having a molecular weight of 20,000 was heated slightly above its melting point and 7% of methyl ethyl ketone peroxide added. Immediately after addition of the peroxide, the molten polymer was subjected to the electron beam recited in Example 1, until it had received a dosage of $20 \times 10^6$ r.e.p. The resulting product was allowed to cool slowly to room temperature to yield a transparent and tough polymer.

EXAMPLE 3

Example 2 was repeated, using benzoyl peroxide in place of methyl ethyl ketone peroxide to obtain a product likewise having improved clarity upon cooling.

EXAMPLE 4

Example 1(c) was repeated, using 1% of methyl ethyl ketone peroxide to obtain substantially the same results.

EXAMPLE 5

100 parts of polyethylene with a molecular weight of about 20,000 (Alathon 14) was blended with 5 parts of benzoyl peroxide at room temperature to form a sheet. The sheet was irradiated at room temperature with the electron beam of the Van de Graaff 2 mev. electron accelerator, described in Example 1, until it had received a dosage of $20 \times 10^6$ r.e.p. There was a significant increase in strength of the irradiated product, although there was no increase in transparency. Additionally, we noted slight increased yellowing imparted to the product. To convert the irradiated and peroxide-treated polymer to a substantially transparent polymer, it was heated to about 120° C. and then quenched to room temperature in a water bath.

EXAMPLE 6

Example 5 was repeated, using 5 parts of methyl ethyl ketone peroxide in place of the benzoyl peroxide. This product was superior to that of Example 5 in that no yellowing of the polymer occurred either before or after irradiation.

EXAMPLE 7

Example 6 was repeated with the addition of 0.5 part of cobalt resinate to give a redox system. The product, both before and after irradiation, was brown colored, due to the natural coloring imparted by the cobalt compound.

EXAMPLE 8

A foamed sheet from 10 parts polyethylene and 0.5 part azo-bis-(isobutyronitrile) was irradiated with the apparatus described in Example 1 at room temperature to give a foamed product of considerably increased toughness and tear strength.

EXAMPLE 9

Example 8 was repeated with a foamed polyethylene made from 10 parts of the polyethylene and 0.5 part of BL-353 (polynitrosodimethyl terephthalate) and the results obtained were similar to those in Example 8.

The samples in all the examples were positioned to travel forwards and backwards under the irradiation beam. Each passage under the beam supplied a dosage of $2 \times 10^6$ r.e.p. to the polyethylene.

By irradiation, it is thus possible to increase the strength of foamed polyethylene. The foamed polyethylene employed can be prepared with the aid of any conventional foaming agent, e.g., carbon dioxide, sodium bicarbonate, diazoaminobenzene, etc. rather than the specific foaming agents recited in Examples 8 and 9.

As previously pointed out, the degree of transparency retained after irradiation and subsequent physical treatments which would normally destroy the transparency imparted, depends entirely upon the irradiation dosage. At a dosage level of $2 \times 10^6$ r.e.p. this increase in retention of transparency first becomes evident to a significant amount. At $6 \times 10^6$ r.e.p. the retention is pronounced. In ascending order of dosage, this retention of transparency is progressively enhanced, being quite good at $20 \times 10^6$ r.e.p. until at $52 \times 10^6$ r.e.p. a mere trace of translucency appears after the subsequent physical treatments. At an even higher dosage, e.g., $100 \times 10^6$ r.e.p., even this trace of translucency does not occur and the irradiated polyethylene retains the water clarity of the treated product, despite subsequent physical changes. It is advisable that the total amount of irradiation be kept below $200 \times 10^6$ r.e.p. for at this dosage polyethylene assumes a permanent amber tint.

A r.e.p. as is recognized in the art is defined as that amount of nuclear radiation which dissipates 93 ergs of energy per gram of tissue, producing $1.61 \times 10^{12}$ ion pairs in the process. It is approximately equal to the amount of energy that would be dissipated by 1 roentgen X-ray beam in a gram of tissue.

As the amount of irradiation dosage administered is increased, the polyethylene diminishes in thermoplasticity until, finally, transformation is effected into a thermosetting plastic.

The irradiated polyethylene of the present invention can be formed while either hot or cold into particles in the customary manner by chopping, or the pellets of Example 2 can be softened and formed into films or other shapes. The resulting products retain their transparency to a substantial extent even on slow cooling, the amount of transparency retained depending on the irradiation dosage, as previously set forth. Specifically, the irradiated pellets of Example 2 could be heated to slightly above the transition temperature of the original polyethylene, molded in the form of a cup, e.g., by compression molding, and then gradually cooled to room temperature to give a substantially clear cup.

The degree of cross-linking developed in irradiated polyethylene beyond the $50 \times 10^6$ r.e.p. level does not lend itself easily to subsequent working. It is, therefore, desirable to confine transfer, compression, extrusion and injection molding procedures to polyethylene which has been irradiated at dosage levels not over $50 \times 10^6$ r.e.p.

In addition to the irradiation dosage, the amount of peroxide employed and its time of treatment also has an effect on the fixed transparency, an increase in amount of peroxide treatment normally permitting a reduction in the amount of irradiation required. Thus, pronounced transparency can be obtained with only $5 \times 10^6$ r.e.p. of irradiation, if 5% methyl ethyl ketone peroxide is present during the irradiation.

The desired shaping, for example, can be carried out at the original transition temperature of the polyethylene which, of course, is considerably below the melting point of the irradiated product, without loss in clarity. With a treatment of $50 \times 10^6$ r.e.p. or above, e.g., $100 \times 10^6$ r.e.p., pressure and vacuum post forming of the polyethylene sheets is still practical as with other types of thermosetting resins.

The time of irradiation, while not critical as long as a dosage of sufficient mega r.e.p. is attained, can vary between 0.75 second and 75 seconds, preferably between 7.5 seconds and 45 seconds. The voltage can vary quite widely and can be 750,000 or 1,000,000 or 2,000,000 or 3,000,000 volts, or 6,000,000 volts, or even higher. In any event, the voltage should be sufficiently high to induce the cross-linking necessary to give the desired light transmission. By appropriate combination of time of treatment and voltage, the desired r.e.p. dosage can be obtained.

The polyethylene treated by irradiation can have a thickness of 3 mils or less (e.g., 1 mil) up to 100 mils, or even higher, e.g., 250 mils, but is preferably about 40 to 50 mils. For thicknesses above 250 mils, the voltage should be above 2,000,000.

Ozone has an adverse effect upon polyethylene. Consequently, it is frequently desirable to have good ventilation or to carry out the irradiation while the polymer is in an atmosphere of inert gas, such as nitrogen or argon. Thus, the irradiation process of Example 2 can be carried out while continuously passing a stream of argon over the polyethylene.

It is also sometimes desirable to carry out the irradiation while the polyethylene is maintained in a vacuum, e.g., 1 mm. or less. Thus, the irradiation in Example 2 can be carried out while the polyethylene is in a vacuum of 0.1 mm. total pressure.

A dosage of about $20 \times 10^6$ r.e.p. with a simultaneous treatment with 5% of a free radical engendering agent, specifically, methyl ethyl ketone peroxide, has been found especially preferred when it is desired to obtain a product having excellent fixed clarity or transparency and which can also be subsequently readily molded.

While the irradiation is preferably carried out with electrons, as set forth above, it is also possible to use other means of irradiation. Thus, if the tungsten target is put back, the machine described in Example 1 will permit X-rays to hit the polyethylene by placing the polymer by the side of the target. However, irradiation with X-rays takes longer than with electrons to obtain the same effect. It is also possible to irradiate with β-rays, e.g., by employing cobalt 60, carbon 14, phosphorus 32, or strontium 90, as a source of irradiation. Gamma rays can be used, e.g., by submitting the polyethylene to irradiation from iron 59 or cobalt 60. Neutrons, protons, α-particles and deuterons also may be employed to bombard the polyethylene.

Instead of using the Van de Graaff electrostatic generator as the source of the electron beam, other sources of high energy electrons can be employed, such as the General Electric 800,000 volt resonant transformer unit described by Lawton et al. in Industrial and Engineering Chemistry, vol. 46, pages 1703 to 1709.

As previously set forth, a process, such as that described in the Lawton et al. article, will not produce a clear polyethylene, as irradiation can only accomplish this result when the polyethylene is transparent at the time of treatment and Lawton et al. treats conventional translucent polyethylene at room temperature.

There can also be employed other conventional apparatus for producing beams of electrons, such as those recited, for example, in Brophy Pat. 2,668,133, col. 3, lines 5 to 29.

As previously pointed out, for best results the irradiation dose should be at least about $20 \times 10^6$ r.e.p. and the polyethylene should have a molecular weight before irradiation of about 20,000 or above. With polyethylene having a molecular weight of 7,000 it is necessary to employ a dosage of at least $100 \times 10^6$ r.e.p., in order to get satisfactory cross-linking and even higher dosages are necessary for lower molecular weight polymers. Correspondingly lower dosages can be employed to obtain cross-linking of higher molecular weight polymers.

The transparent polyethylene can be formed into valuable products in any of the conventional ways employed with customary translucent polyethylene, such as by making blown films or extruding films for packaging purposes, casting, vacuum molding, pressure molding, injection molding or even by punching articles, e.g., cap liners or ring gaskets, from blanks.

The transparent polyethylene of the present invention can be employed in almost all instances where clear vinyl resins or acrylates and methacrylates are now used. The new polyethylene is of particular advantage, due to its increased strength and resistance to elevated temperature.

Figure 2:
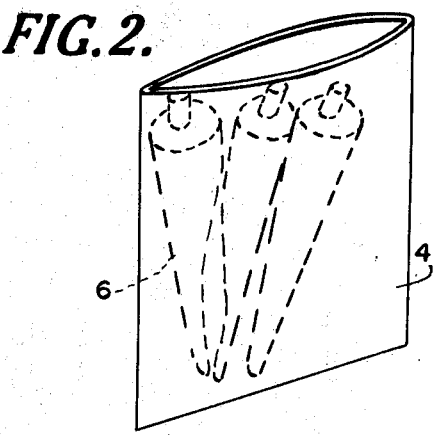
Figure 3:
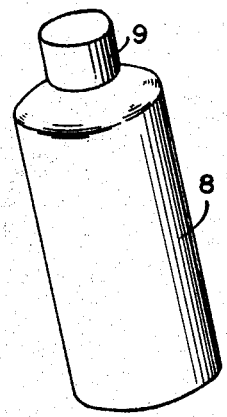
Figure 4:
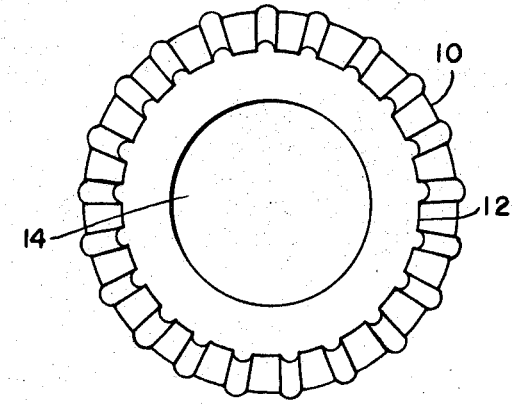
Figure 5:
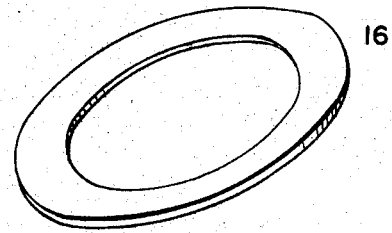

Typical uses for the new transparent polyethylene are disclosed in the drawings, wherein:

FIG. 1 is a perspective view of a box;
FIG. 2 is a perspective view of a flexible bag;
FIG. 3 is a perspective view of a squeeze bottle;
FIG. 4 is a bottom view of a crown cap; and
FIG. 5 is a perspective view of a ring gasket.

Referring more specifically to the drawings, in FIG. 1 there is shown a box 2, made of the transparent polyethylene of the present invention. The box can be used, for example, as a silverware container.

In FIG. 2 there is shown a flexible bag 4, made of transparent polyethylene. Such bags are particularly desirable for displaying food products, designated generically at 6, in grocery stores, as the customer desires to see the product before buying. Thus, there can be packaged vegetables, such as carrots and lettuce, or meats, such as turkey, or candies or even ice cream.

The transparent polyethylene also can be used to replace the conventional translucent polyethylene in making a squeeze bottle 8 and cap 9 with enhanced esthetic values. Such bottles also can be used in place of tin cans or glass jars. If desired, although this is not ordinarily preferred, the transparent polyethylene can be tinted with organic dyestuffs to give colored bottles, and other products, which retain their transparent characteristics.

The transparent polyethylene also can be molded into cap liners, such as the liner 12 in crown cap 10. It is possible to provide such liners with a central recess, as shown at 14. In addition, the transparent polyethylene can be formed into a ring gasket 16, and advantage taken of the transparency, e.g., in building working models of machines, where it is desired to see the entire operation.

It is also possible to sterilize articles packaged in transparent polyethylene containers, such as the bag 4 and the bottle 8, by submitting the package to heat sterilization, e.g., a bottle, formed from polyethylene having a thickness of 45 mils could have the articles therein sterilized by submitting the package to a temperature of 58° C. to 60° C. for 24 hours. Also, higher temperatures can be employed for shorter periods of time, e.g., 110° C. for 5 minutes on three consecutive days to kill spores.

The transparent polyethylene is especially desirable for use as liners with caps for wide mouthed containers, as the interior of the cap may be decorated and observed through the liner because of the transparency of the latter. The new polyethylene of the present invention can also be used in coatings and other coverings.

The uses recited above are not exhaustive but are illustrative only and in no way limit the invention.

We claim:
1. A process comprising cross-linking polyethylene by the use of both high energy ionizing irradiation at a dosage of at least about $2 \times 10^6$ r.e.p. and a free radical polymerization catalyst selected from the group consisting of peroxy compounds, azo compounds and polynitrosodimethyl terephthalate.

2. A product made by the process of claim 1.

3. A process according to claim 1, wherein the cross-linking is accomplished by the simultaneous use of high energy ionizing irradiation and said free radical polymerization catalyst.

4. A process according to claim 1, wherein the free radical polymerization catalyst is added prior to the irradiation treatment.

5. A process according to claim 1, in which the irradiation is done with electrons.

6. A process according to claim 5, in which the irradiation dosage is between about $2 \times 10^6$ and $100 \times 10^6$ r.e.p.

7. A process according to claim 6, in which the irradiation dosage is between about $6 \times 10^6$ and $50 \times 10^6$ r.e.p.

8. A process according to claim 1, wherein the irradiation is done with electrons and the free radical polymerization catalyst comprises a peroxy compound.

9. A process according to claim 1, wherein the polyethylene is first rendered clear and transparent and, while in the clear state, is cross-linked to a sufficient extent to retain at least a part of the transparency upon subsequent heating and slow cooling.

10. A process according to claim 9, wherein the irradiation and free radical polymerization catalyst treatments are applied simultaneously.

11. A process according to claim 9, in which the polyethylene is subjected to the free radical polymerization catalyst prior to the irradiation.

12. A process according to claim 9, wherein the polyethylene has a molecular weight of at least about 12,000.

13. A process according to claim 9 wherein the irradiation is between about $2 \times 10^6$ and $100 \times 10^6$ r.e.p.

14. A process according to claim 9, wherein the irradiation is between about $6 \times 10^6$ and $50 \times 10^6$ r.e.p.

15. A process according to claim 9, wherein the irradiation is carried out on molten polyethylene.

16. A process according to claim 9, wherein the irradiation is carried out upon polyethylene at room temperature.

17. A process according to claim 1, wherein the free radical polymerization catalyst is azo-bis-(isobutyronitrile).

18. A process according to claim 1 wherein the irradiation is carried out in an atmosphere consisting of an inert gas.

19. A process comprising irradiating a polyethylene foamed with azo-bis(isobutyronitrile) as a foaming agent with an irradiating dosage of high energy electrons of $2 \times 10^6$ to $100 \times 10^6$ r.e.p.

20. A process comprising cross-linking polyethylene by the use of both high energy electron irradiation at a dosage of between 2 and $200 \times 10^6$ r.e.p., the irradiation being equivalent to at least about 750,000 electron volts, and a free radical polymerization catalyst selected from the group consisting of peroxy compounds, azo compounds and polynitroso dimethyl terephthalate.

21. A process comprising irradiating a polyethylene foamed with an azo compound as the foaming agent with an irradiating dosage of high energy ionizing irradiation of $2 \times 10^6$ to $100 \times 10^6$ r.e.p.

References Cited

UNITED STATES PATENTS

| | | | |
|---|---|---|---|
| 2,878,174 | 3/1959 | Rainer et al. | 204—159.2 |
| 2,855,517 | 10/1958 | Rainer et al. | 204—159.2 |
| 2,907,675 | 10/1959 | Gaylord | 204—159.2 |
| 2,948,665 | 8/1960 | Rubens et al. | 204—159.2 |
| 2,936,261 | 5/1960 | Cole | 204—159.2 |

FOREIGN PATENTS

| | | |
|---|---|---|
| 582,559 | 11/1946 | Great Britain. |
| 714,843 | 9/1954 | Great Britain. |
| 740,899 | 11/1955 | Great Britain. |

OTHER REFERENCES

Charlesby, "Nucleonics," pp. 18–25, June 1954.

Raft et al., "Polyethylene," High Polymers, vol. XI, Interscience Publishers, Inc., New York, N.Y., pp. 61–65, 138–155 (1956).

SAMUEL H. BLECH, Primary Examiner

R. B. TUVER, Assistant Examiner

U.S. Cl. X.R.

260—2.5, 94.9